(12) United States Patent
Souza et al.

(10) Patent No.: US 6,774,066 B1
(45) Date of Patent: Aug. 10, 2004

(54) COMPOSITE STRUCTURAL REINFORCEMENT DEVICE

(76) Inventors: James M. Souza, 2700 Clinton, Longview, TX (US) 75604; Glenn Davis, 2 Oak Creek Ridge, Longview, TX (US) 75605; Billy H. Davidson, 803 Country Club Rd., Gladewater, TX (US) 75647

( * ) Notice: Subject to any disclaimer, the term of this patent is extended or adjusted under 35 U.S.C. 154(b) by 491 days.

(21) Appl. No.: 09/594,621

(22) Filed: Jun. 15, 2000

Related U.S. Application Data

(60) Provisional application No. 60/179,421, filed on Jan. 31, 2000.

(51) Int. Cl.$^7$ .......................... B32B 15/08; B32B 15/14; F16L 55/16
(52) U.S. Cl. ........................ 442/228; 52/179; 52/578; 52/586.2; 138/99; 252/62.51 R; 264/274; 442/6; 442/19; 442/52; 442/58; 428/33; 428/53; 428/60; 428/101; 428/161; 428/163; 428/167; 428/141; 428/582; 428/583; 428/900
(58) Field of Search ...................... 52/179, 578, 586.2; 138/99; 252/62.51 R; 264/274; 442/6, 19, 52, 58, 228; 428/33, 53, 60, 101, 161, 163, 167, 141, 582, 583, 900, 171; 156/298; 128/692, 147

(56) References Cited

U.S. PATENT DOCUMENTS

| | | | | |
|---|---|---|---|---|
| 3,778,334 A | * | 12/1973 | Sturgeon | ...................... 428/37 |
| 4,081,302 A | * | 3/1978 | Drostholm et al. | ......... 156/190 |
| 4,888,247 A | * | 12/1989 | Zweben et al. | ............. 428/105 |
| 6,456,053 B1 | * | 9/2002 | Rowley | ...................... 324/67 |

* cited by examiner

*Primary Examiner*—Ula C. Ruddock
*Assistant Examiner*—Jennifer Boyd
(74) *Attorney, Agent, or Firm*—Ronald B. Sefrna

(57) ABSTRACT

A composite structural reinforcement device to be applied to structural members by wrapping in successive overlying layers includes a body formed of a first ply of resin impregnated high tensile strength material, a second ply of resin impregnated high tensile strength material, a magnetically detectable ply disposed and bonded between the first and second plies, an interlock means for mechanically interlocking successive layers as the device is applied to a structural member, and an alignment means for aligning successive layers of the device in overlying relation. Various alternative embodiments and various combinations of features are disclosed.

25 Claims, 10 Drawing Sheets

COMPOSITE STRUCTURAL REINFORCEMENT DEVICE

RELATED APPLICATION INFORMATION

This application claims the benefits of U.S. Provisional Patent Application Ser. No. 60/179,421, filed Jan. 31, 2000, titled "Composite Structural Reinforcement Device".

FIELD OF THE INVENTION

The present invention generally relates to the field of structural reinforcement devices, and in its preferred embodiments more specifically relates to an interlocking, self-aligning, magnetically detectable reinforcement device structure.

BACKGROUND OF THE INVENTION

All structural members are subject to deterioration and damage over time, and it is often necessary to repair and/or reinforce structural members to preserve or restore their integrity and extend their useful lives. The problems resulting from deterioration affect pipelines, which are subject to deterioration due to several factors, including sulfate reducing bacteria, cathodic actions, and third party damage. The problem is certainly not limited to such pipelines, and also affects other structures, such as concrete columns, which are also subject to deterioration and to damage. However, the problem is particularly acute for pipelines, because they are difficult to inspect, and carry gases and liquids under high pressure over long distances in extensive systems. Pipeline deterioration can be highly problematic, not only because of economic factors, which are significant, but also because of the potential hazards to the environment and to human safety associated with release of many of the substances transported through pipelines.

Pipelines are typically constructed of metallic pipe, and it has become a relatively common practice to monitor the integrity of pipelines by sending a device, often referred to as a "smart pig", through the line. This device induces a strong magnetic field and records the deviation of the field to establish pipe wall integrity. If a pipeline has developed a significantly corroded area, the resulting anomaly, or lack of continuity, in the magnetic field can be detected. Since the location of the detection device can be monitored or determined, the location of the corroded area can be determined and repaired.

Various approaches to repairing and reinforcing weak areas in pipelines have been developed over the years. Similar approaches are also used for repair and reinforcement of other structural members. In general, the prior art approaches include metallic devices, often in the form of split sleeves, which are welded or otherwise attached to the pipeline around the weak spot; and non-metallic devices, generally in the form of resin impregnated uni-directional fiber tapes that are wound around the pipe and secured by some form of adhesive. Both of these prior art approaches can be reasonably effective, but both suffer from certain problems and drawbacks. The typical prior art metallic repair technology requires welding or other "hot working" to attach the device to the pipeline, which may create significant hazards if the fluid carried in the pipeline is explosive or flammable. The welding process, especially in field repair conditions, requires skilled operators, and may nonetheless result in incomplete welds or later weld failures, which can give rise to future pipeline failures. Problems can arise from galvanic action between the pipeline and the metallic repair material. The use of sleeves that are bolted in place around the pipeline also creates problems and results in uncertain repairs. With bolted sleeves, a resilient liner is normally required between the sleeve and the pipe, and sealing of the leak or corroded area depends on the formation of a complete seal at the time of repair and upon the continued integrity of the liner over an extended period of time. Bolted sleeves and resilient liners do not preclude the entry of moisture between the sleeve and the pipe, and any deterioration of the sleeve may allow fluid to escape from the pipeline. As a result of these deficiencies in metallic repair technology, it is often necessary to reduce the pressure of the fluid carried in the pipeline, thereby reducing the flow rate.

Prior art non-metallic repair and reinforcement technology has its own set of problems and difficulties. Typical prior art resin impregnated tapes incorporate unidirectional fibers, which are subject to longitudinal shearing problems. The occurrence of shear compromises structural integrity and also creates an entry point for moisture, which can "wick" through the fiber. In an effort to control shearing, a resin filled polyethylene/polypropylene tape is often used to cover leading and trailing edges. However, the tape surface does not effectively bond with existing adhesive systems, and it is difficult to eliminate voids and moisture penetration. Attachment of the non-metallic tape devices of the prior art relies upon the bonding strength of the adhesive used, but it is difficult to ensure uniform adhesive coverage and thus uniform and effecting bonding. The "wrap pattern" can be difficult to control with conventional devices, leading to variations in coverage and reductions in integrity. A significant disadvantage of the prior art non-metallic technology is its transparency to pipeline detection devices. Even if a repair is adequately made, the repaired location will continue to be registered as a void or leak in the pipeline, creating a monitoring problem, placing a greater burden on the pipeline operators to interpret anomalies previously repaired, and reducing the overall reliability of detection devices in monitoring pipeline integrity.

There remains a definite need for a repair and reinforcement device that achieves desired results without the disadvantages and drawbacks of the prior art, that improves reliability and integrity of the repair or reinforcement, that promotes uniformity in application, that avoids alignment problems, that is safe to use without fire or explosion hazard, and that is detectable by conventional pipeline monitoring devices.

SUMMARY OF THE INVENTION

The present invention provides a cured pre-formed composite device for pressure containment, and/or structural reinforcement. The invention encompasses a device formed as a metallic/non-metallic hybrid structure that is magnetically detectable, and also encompasses devices that are self-locking and self-aligning. The device of the invention is less susceptible to shearing than structures known in the prior art, and provides superior corrosion resistance for structural members such as steel piping and concrete columns. The cured pre-formed composite device is applied by wrapping the device, with or without an adhesive, in a plurality of layers around degraded structural members to provide pressure containment and/or structural reinforcement. All voids and/or tented areas in the structural member are filled with a load transfer material prior to installation of the device.

The material of construction of the invention generally comprises a cured metallic/non-metallic composite hybrid, formed into a device for use as structural reinforcement and/or pressure containment. The preferred laminate construction of the device preferably comprises a ferrous or ferrous-based mesh, bands, or sheets of magnetic material or other materials which influence magnetic fields, sandwiched between plies of resin impregnated high tensile strength fiberglass and/or other advanced materials such as carbon/graphite and aramid fibers, pre-formed into a thin multi-ply device detectable by magnetic inspection devices. The magnetically detectable material is sandwiched the entire width or a portion thereof and may be either continuous or intermittently placed along the length of the device. Although the material of the invention may be formed into almost any configuration as appropriate for its intended use, it is contemplated that the material will most typically be formed into generally shape-retentive devices configured as "coils". The shape of coils in which the cured pre-formed composite device is formed is determined by the fabrication tooling, and may be cylindrical, or rectangular, or any derivation thereof, depending upon the intended use. Both the width and the total length of the composite device is determined by the shape, size and required reinforcement of the structural member to which it is to be applied.

The invention also encompasses a device in which the surface of both faces of the cured composite material is embossed with a multiplicity of locking serrations or equivalent geometric shapes to interlock layers of the material as they are applied to a pipe or other structure. The serrations, either continuous or intermittent, are preferably oriented perpendicular with respect to the composite laminate length, and thus parallel to the axis around which the layers of the "coil" are formed. The serrations provide a mechanical interlock between layers of the material comprising the device as a means of securing the device. This feature may be used in conjunction with an adhesive, as a redundant system, to ensure device reliability. The embossing of the faces of the device serves to increase the bonding surface of the faces of the device and increases the effectiveness of an adhesive bond.

The invention also provides a structure in which the surface of both faces of the cured composite material are embossed with alignment "v-grooves" or equivalent geometric shapes to facilitate alignment of layers of the material of the device as they are wrapped around a structure, such as a pipe. The "v-grooves" or equivalent geometric shapes extend, continuously or intermittently, along one or both outer edges, or at any position between the edges, of the preformed composite material, and are oriented parallel to the composite laminate length. The alignment feature ensures that the plurality of layers is consistently deployed in the proper position as the device is applied to a pipe or other structure.

The structure and features of the invention, individually and in combination, provide a structural reinforcement device that is highly effective for its intended use without the disadvantages prevalent in the prior art. The preferred and alternative structures and features of the invention are described in more detail below, with reference to the accompanying drawing figures.

DESCRIPTION OF PREFERRED AND CERTAIN ALTERNATIVE EMBODIMENTS

Figure 2:
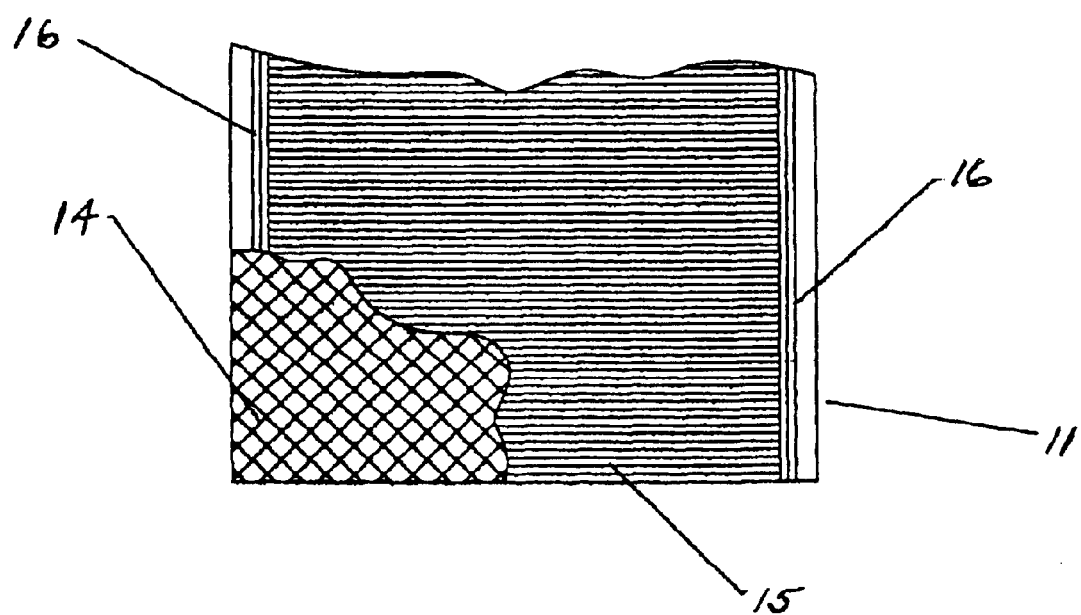
FIG. 2 is a partially cut-away top view of a portion of the body of the preferred embodiment of the device of the invention, illustrating the structure and features thereof.
Figure 5:
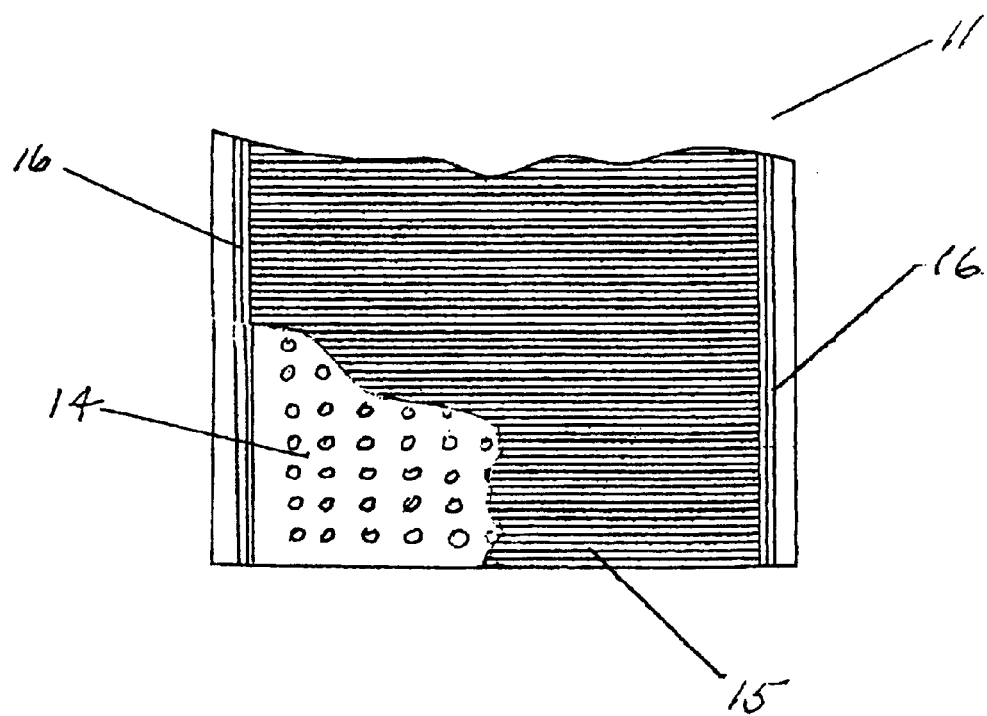
FIG. 5 is a partially cut-away top view of a portion of the body of the device of the invention, illustrating an alternative embodiment of the magnetically detectable ply.
Figure 6:
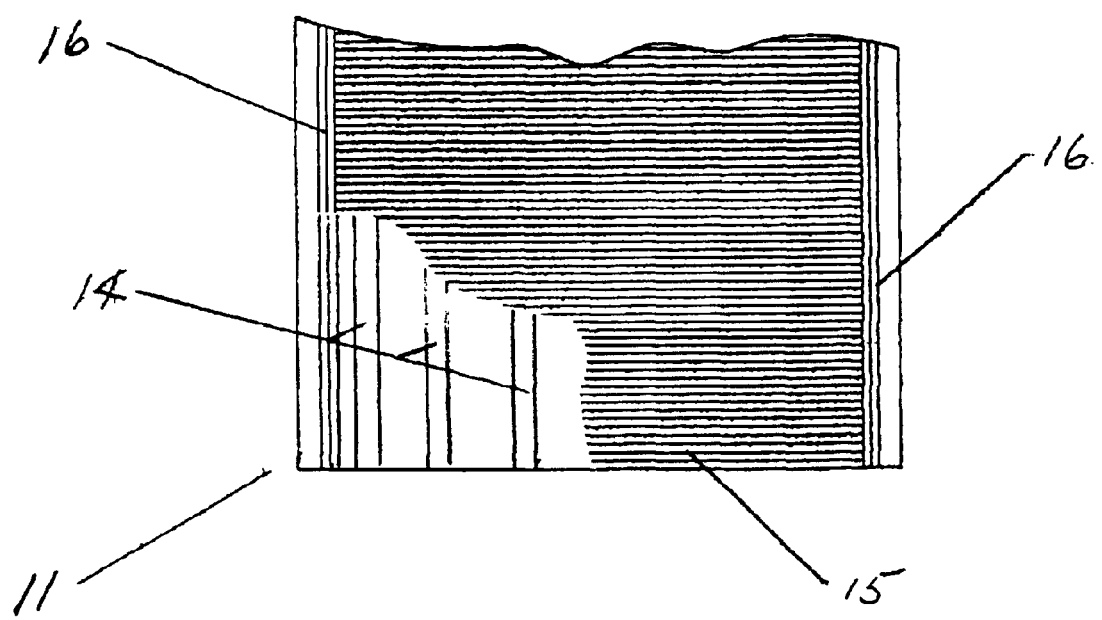
FIG. 6 is a partially cut-away top view of a portion of the body of the device of the invention, illustrating another alternative embodiment of the magnetically detectable ply.

Referring to the drawing figures, and initially with particular reference to FIG. 2, the preferred embodiment of the device of the invention, generally designated by reference numeral 10, comprises an elongate, generally planar body 11, formed as a laminate construction. The laminate construction of the preferred embodiment includes a first ply 12 and a second ply 13, each comprising a resin impregnated tape of a high tensile strength material such as fiberglass, carbon/graphite, and/or aramid fibers; with a thin ply of magnetically detectable material 14 disposed between and bonded to both the first and the second fiber plies. In the preferred embodiment the magnetically detectable material comprises a ferrous or ferrous-based metal that is affected by magnetic fields and thus detectable by a conventional magnetic detection instrument used for pipeline inspection. However, the scope of the invention is not limited to the use of a metallic material, and any suitable material that disrupts or influences magnetic fields and is thus detectable by a detection instrument may be used for that purpose. In the preferred embodiment illustrated in FIG. 2, the material of the magnetically detectable ply is formed as an open mesh. Alternatively, the magnetically detectable ply may comprise a metallic sheet, as illustrated in FIG. 5, or may comprise a plurality of bands, as illustrated in FIG. 6. The mesh configuration is preferred because that structure is flexible and easily rolled, and because the voids formed by the mesh structure allow resin to extend through the magnetically detectable ply from the fiber plies and bond the laminate structure into an integrated whole. If a metallic sheet is used, it is preferred that it be perforated to allow penetration of the resin and achieve a satisfactory bonding of the layers of the laminate structure.

Figure 12:
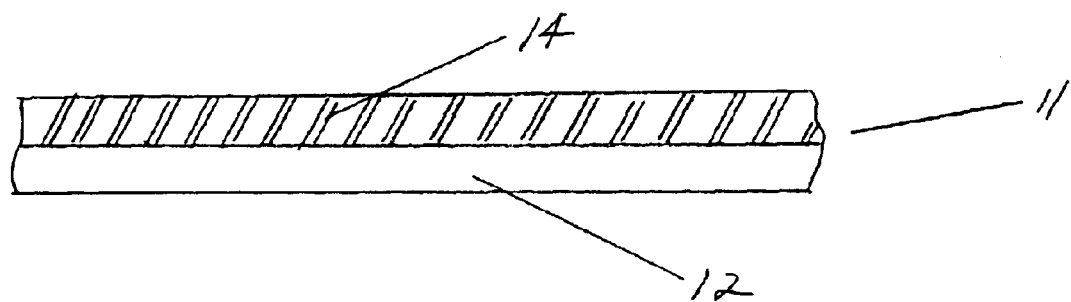
FIG. 12 is an edge or side view of a portion of an alternative embodiment of the body of the device of the invention, showing an alternative two-ply laminar structure.
Figure 11:
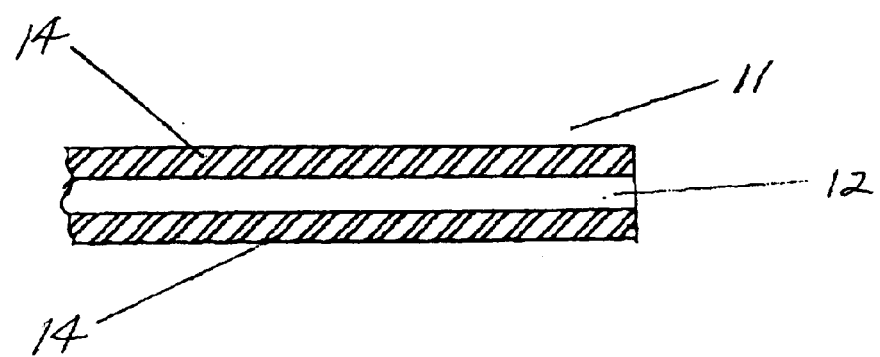
FIG. 11 is an edge or side view of a portion of an alternative embodiment of the body of the device of the invention, showing an alternative three-ply laminar structure.

In alternative embodiments of the laminate structure of the body of the device, the body 11 may also be formed with a single fiber ply 12 bonded between two magnetically detectable plies 14, as indicated in FIG. 11. In a further alternative, a two ply body may be formed by bonding one fiber ply 12 to a single magnetically detectable ply, as indicated in FIG. 12.

Figure 7:
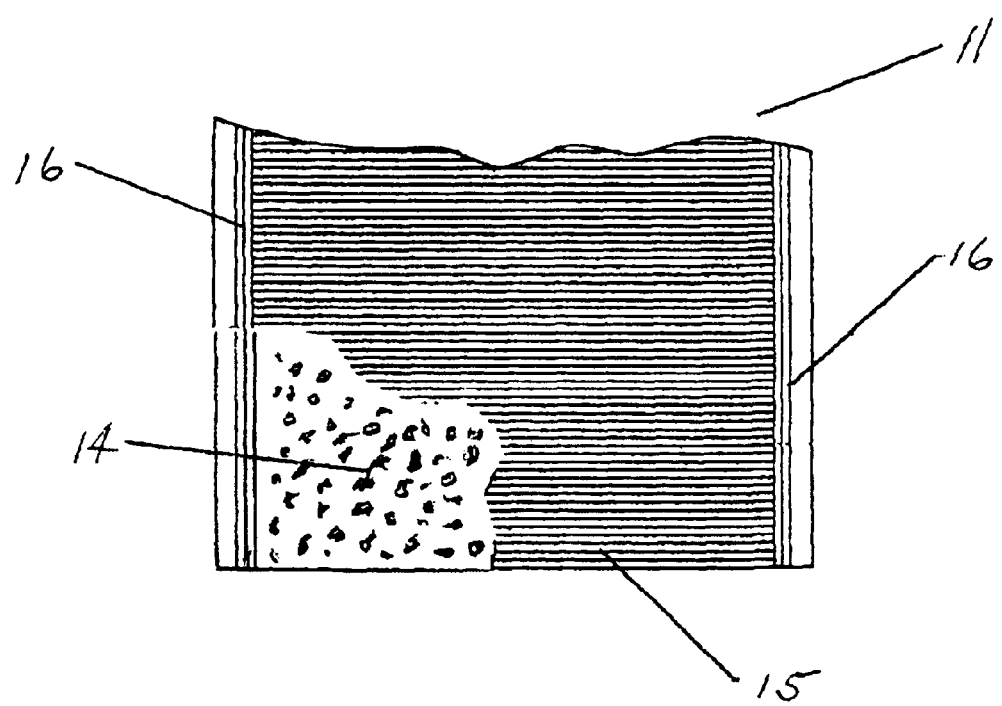
FIG. 7 is a partially cut-away top view of a portion of the body of the device of the invention, illustrating the use of magnetically detectable particles between fibrous plies to provide magnetic detectability.

The magnetically detectable feature may also be provided for the device without the use of a discrete magnetically detectable ply in the composite structure, if desired. For example, magnetically detectable particles may be embedded in the body of the device during manufacture, as illustrated in FIG. 7, such as by distributing particles between the fibrous plies so that they are bound within the structure of the body of the device when the resin cures. Particles may also be disposed on one or both of the outer faces of the body of the device during manufacture, instead of or in addition to placement between plies. Although the use of particles or the like will make the device magnetically detectable, that approach does not provide the additional structural integrity afforded by the use of, e.g., a ferrous mesh ply between the fibrous plies.

Figure 8:
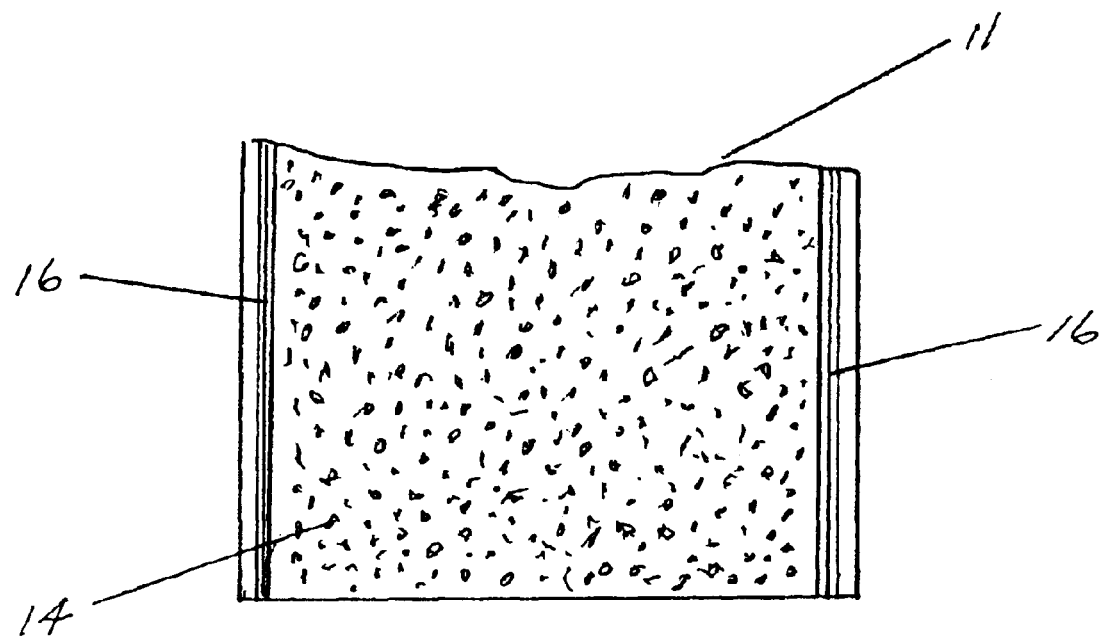
FIG. 8 is a top view of a portion of a single-ply body alternative embodiment of the device of the invention, illustrating the use of magnetically detectable particles applied to the outer face(s) of the body.

The magnetically detectable feature may also be provided in a single-ply device, or in a device with more than two fibrous plies. Magnetically detectable particles may be affixed to the outer face of a single ply of resin impregnated fibers, as illustrated in FIG. 8. Fibers of magnetically detectable material could also be intermixed with the fibers of the tape during manufacture of the tape to provide the desired detectability feature.

Figure 1:
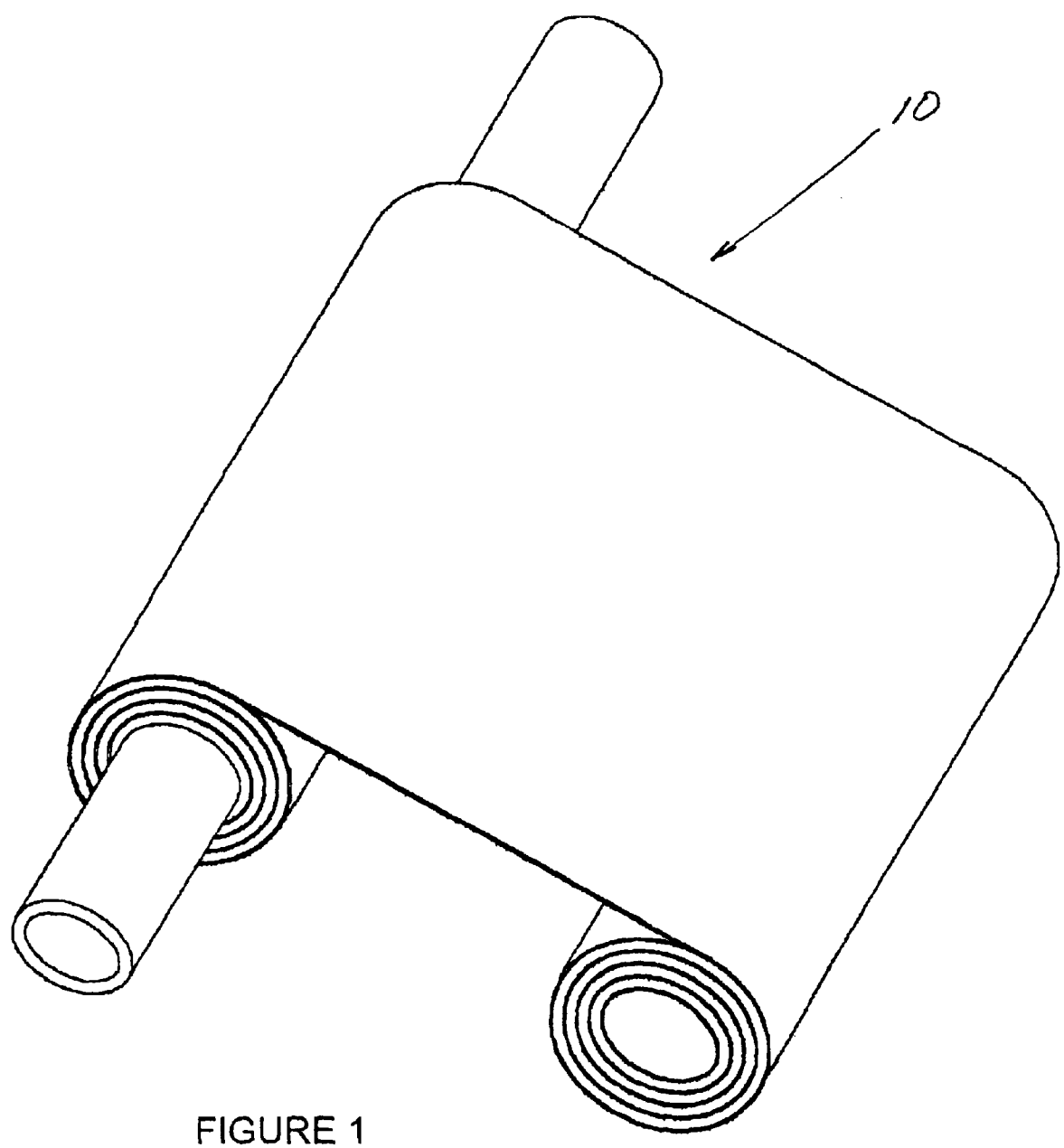
FIG. 1 is a schematic illustration of a manner of installation of the device of the invention, in cylindrical coil form, to a pipe for structural repair or reinforcement.

The device of the invention is applied to a structure, such as a pipe, as illustrated in FIG. 1. The device is wrapped around the pipe in multiple layers. As indicated in FIG. 1, the device is preferably prepared for application in the form of a coil, so that it can be readily handled and applied to the pipe or other structure. The pre-formed coil configuration also has the effect of biasing the orientation of elongate body 11 so that it will resume the coiled configuration around the pipe to assist in the formation of tight layers as the device is applied. Neither the length nor width of the body of the device is critical to the invention, and the dimensions will be determined in accordance with the application for which the device is to be used. It is contemplated that the device will be made commercially available in a variety of standard lengths and widths.

Figure 3:
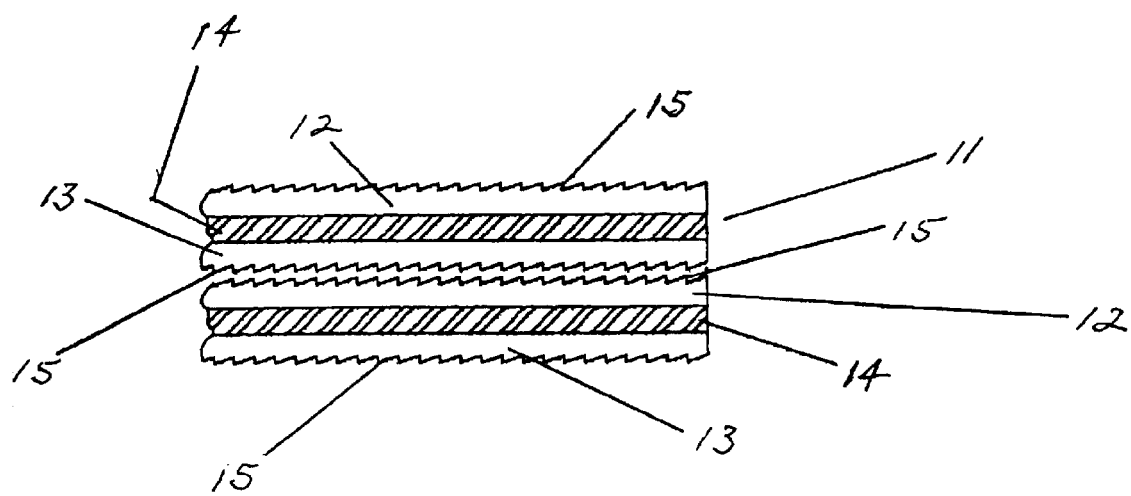
FIG. 3 is an edge or side view of two portions of the body of the preferred embodiment of the device of the invention in overlying relation, illustrating the structure of the body and the interlock feature.

In the preferred embodiment, the outer faces of body 11 of the device includes a multiplicity of interlocking means extending laterally across those faces, formed by embossing or other convenient means. As shown in FIG. 2, and in more detail in FIG. 3, the interlocking means comprise regular serrations 15 that will mechanically interlock when brought into overlying relationship to mechanically secure the position of the faces relative to each other and resist longitudinal shift, positively retaining the device in place on a pipe or other structure around which it is wrapped. It is preferred that the serrations of the interlock system be angled as shown in FIG. 3 to facilitate the formation of a secure interlock, but other profiles may be used. It is also preferred that the serrations be closely spaced, in order to assure serration alignment and interlock between faces of the body as the device is wrapped around a structural member. The device with interlock means may be used with adhesive, if desired, to assure complete bonding of the applied device into an essentially unitary structure, but the inclusion of the interlock means makes it very feasible to use the device without adhesive and still achieve a secure application.

Although it is preferred that the interlock means extend across and continuously along both faces of the body of the device, the interlock means may be placed intermittently. In one alternative, the interlock means may be disposed in bands extending longitudinally along, e.g., the edges of the body of the device, with an open area between them. If adhesive is applied in the space between the interlock bands, the interlock structure establishes a uniform spacing between successive wraps of the device body, and thus assures a uniform adhesive thickness and promotes consistent adhesion. It is also possible to dispose the interlock means intermittently along the length of the body of the device, but this approach is not preferred since serration to serration mating in successive wraps is less certain.

Figure 9:
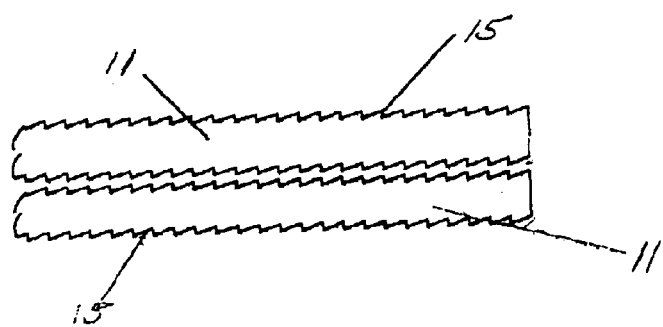
FIG. 9 is an edge or side view of two portions of the body of a single-ply alternative embodiment of the device of the invention in overlying relation, showing the interlock feature.

In the illustration of FIG. 3 the preferred embodiment of the device, in which body 11 is formed of discrete plies, is shown, but the interlock feature of the invention may also be beneficially used with a single-ply body structure, such as that described above in the context of magnetically detectable particles. The interlock feature of the invention is illustrated in FIG. 9 with an alternative structure in which body 11 is unitary instead of comprising discrete plies 12, 13, and 14.

Figure 4:
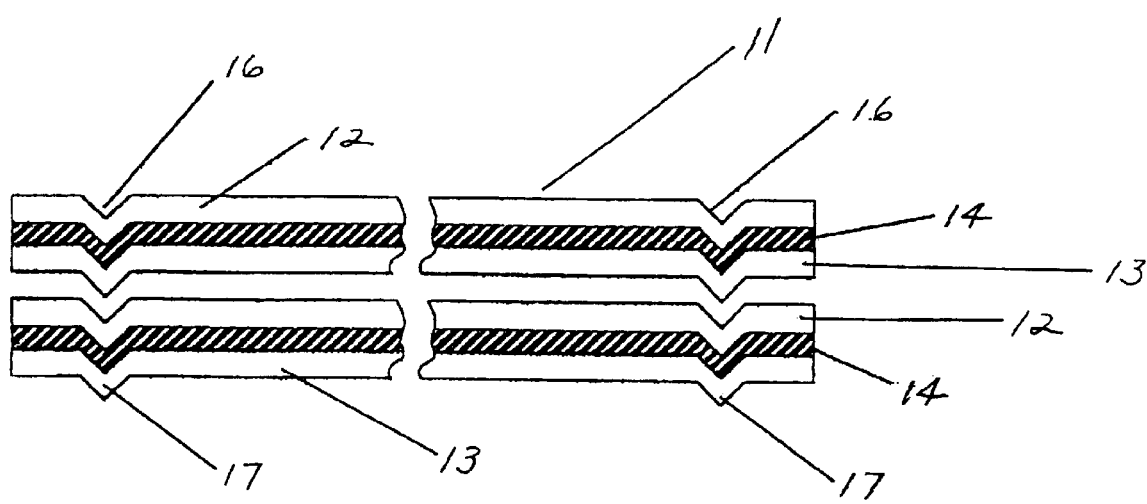
FIG. 4 is a sectioned end view of two portions of the body of the preferred embodiment of the device of the invention in overlying relation, illustrating the structure and the self-alignment feature.

The preferred embodiment of the device of the invention also includes alignment means disposed in proximity to the edges of body 11, for the purpose of aligning successive wraps of the device as it is applied to a structural member. In the preferred embodiment, illustrated in FIG. 4, the alignment means at each edge of the body comprises a V-shaped groove 16 formed in one face of the body, and a matching V-shaped projection 17 on the opposite face of the body. The grooves and matching projections are formed by embossing the material of the device, displacing the material of construction from the plane of the body to simultaneously form the groove 16 and projection 17. As the device is wrapped around a pipe or other structural member, the projections are received in the matching grooves of the previously completed wrap, assuring alignment of each successive wrap with all previously completed wraps and preventing lateral shift or displacement. The V-shaped configuration of grooves 16 and projections 17 is preferred because that configuration tends to be "self-aligning" as the device is wrapped, so long as the "point" of the projection is initially received anywhere within the groove. As downward force applied during application of the device, an initially off-center projection will slide down the side of the groove until the point of the projection reaches the point of the groove. However, it should be understood that the grooves and projections may be formed in other matching geometric shapes if desired. It should also be understood that any convenient means of forming the grooves and projections in the body of the device may be used. In a further variation of the invention, the grooves may be disposed inward from the edges of the body.

Figure 10:
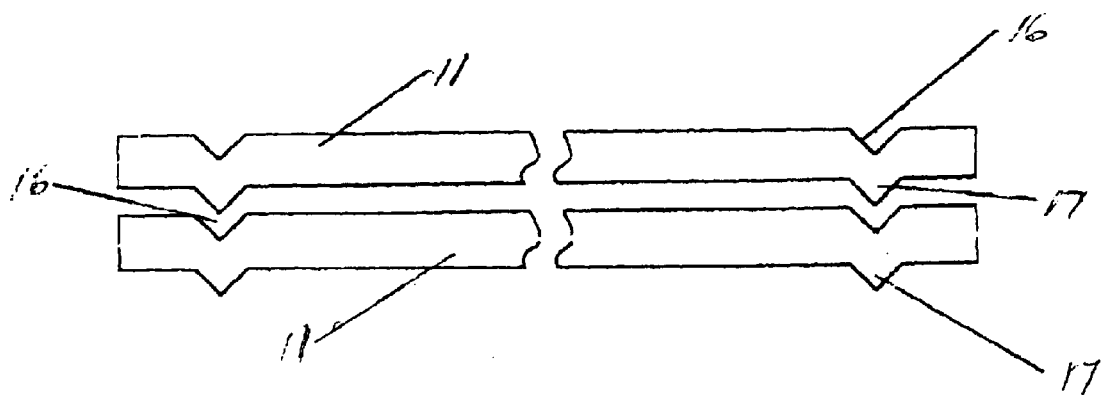
FIG. 10 is a sectioned end view of two portions of the body of a single-ply alternative embodiment of the device of the invention in overlying relation, showing the self-alignment feature.

Although in the preferred embodiment the grooves and projections extend along the body continuously, they may be provided intermittently. An intermittent design is not preferred because of the possibility that during application of the device portion of the body with projections may overlie a portion of the body that does not have a matching groove, and the overlying faces of the body will not be in full contact with each other. In another alternative, a single set of groove and projection may be formed; e.g., centered between the edges of the body. When the width of the body of the device is relatively large, it may be advantageous to include one or more sets of groove and projection alignment means in addition to providing alignment means at the edges of the body, to prevent any "creep" of the mid portion of the body during application. In an alternative embodiment, the alignment means may be provided in a body of single-ply construction, shown in FIG. 10, as may the magnetic detectability feature and the interlock feature as described above.

Although the preferred embodiment of the device described above includes a full combination of all described features, the device may also be provided with only one of the described features, or with any combination of two of the described features. In addition to the preferred embodiment, without including alternatives embodiments for each of the described features, six alternative configurations may be provided, as follows: detection means alone, interlock means alone, alignment means alone, detection means and interlock means, detection means and alignment means, and interlock means and alignment means. Each feature and each combination of features provides a structural reinforcement device with enhanced features and improved performance in comparison to the prior art, and the ability to select the inclusion of features allows the device to be specifically tailored to the intended use. As but one example, if the device is to be used to reinforce a concrete structural member or a non-metallic pipe, where detectability of the device is not needed, the magnetically detectable ply could be omitted.

It is contemplated and preferred that the device of the invention be formed into a coiled configuration, as shown in FIG. 1, and cured in that configuration during the manufacturing process. The material of construction of the device is shape retentive, though flexible, and the device will tend to return to the coiled configuration when extended and then released. The preformed configuration facilitates installation of the device by providing a compact and easily manipulated coil. Since the material of construction is shape retentive, the device is biased to return to a coiled configuration around a structural member to which it is applied, helping to assure an effective, tightly wrapped installation.

The foregoing description of the preferred and various alternative embodiments of the device of the invention is intended to be illustrative and not limiting. It is to be understood that the device of the invention is susceptible to additional embodiments and variations within the scope of the invention as defined by the claims, which are intended to be interpreted appropriately to encompass all novel and non-obvious features of the invention.

What is claimed is:

1. A magnetically detectable composite structural reinforcement device to be applied to a structural member in a plurality of overlying layers, comprising a first elongate generally planar ply formed of a high tensile strength material impregnated with a curable resin, said first ply having a longitudinal axis and first and second edges;

a second elongate generally planar ply formed of a high tensile strength material impregnated with a curable resin, said second elongate ply having a longitudinal axis and first and second edges, said second ply disposed in overlying relation to said first ply with said longitudinal axes and said edges of said plies in alignment; and an elongate generally planar detectable ply formed of magnetically detectable material, said detectable ply having a longitudinal axis and first and second edges, said detectable ply disposed and interconnected between said first and second plies with said first and second edges of said detectable ply in mutual alignment with said first and second edges of said first and second plies;

said plies bonded together to form a continuous elongate body having a longitudinal axis parallel to said longitudinal axes of said plies, having an upper face and a lower face, and having first and second edges, said body being magnetically detectable by a pipeline structural integrity monitoring device.

2. The composite structural reinforcement device of claim 1, wherein said detectable ply comprises an open mesh formed of a ferrous metal.

3. The composite structural reinforcement device of claim 1, wherein said detectable ply comprises a thin sheet of ferrous metal.

4. The composite structural reinforcement device of claim 3, wherein said sheet is penetrated by a plurality of perforations.

5. The composite structural reinforcement device of claim 1, wherein said detectable ply comprises a plurality of thin narrow bands of ferrous metal disposed in spaced relation between said first and second plies.

6. The composite structural reinforcement device of claim 1, wherein said detectable ply comprises a multiplicity of discrete particles of magnetically detectable material disposed between said first and second plies.

7. The composite structural reinforcement device of claim 1, further comprising interlock means formed on said upper face and said lower face of said body for the purpose of forming a mechanical interlock between said faces during application of the device to a structural member so as to resist longitudinal movement of said faces relative to each other.

8. The composite structural reinforcement device of claim 7, wherein said interlock means comprises a multiplicity of serrations formed in said upper face and in said lower face of said body between said edges thereof in generally perpendicular relation to said longitudinal axes of said plies.

9. The composite structural reinforcement device of claim 1, further comprising alignment means disposed in directly opposed relation on said upper and lower faces of said body for the purpose of aligning successive layers of the device during application of the device to a structural member.

10. The composite structural reinforcement device of claim 9, wherein said alignment means comprises a longitudinal groove extending into said body from one of said faces thereof and extending along said body parallel to said longitudinal axis thereof, and a matching longitudinal projection extending outwardly from the other of said faces thereof and extending along said body parallel to said longitudinal axis thereof directly opposite said groove, so that said projection is received in said groove as the device is applied in overlying layers to a structural member.

11. The composite structural reinforcement device of claim 10, wherein a first said alignment means is disposed in proximity to said first edge of said body, and wherein a second said alignment means is disposed in proximity to said second edge of said body.

12. A composite structural reinforcement device to be applied to a structural member in a plurality of overlying layers, comprising a continuous elongate body formed of high tensile strength material impregnated with a curable resin, said body having a longitudinal axis, having an upper face and a lower face, and having first and second edges; and interlock means formed on said upper face and said lower face of said body for the purpose of forming a mechanical interlock between said faces during application of the device to a structural member so as to resist longitudinal movement of said faces relative to each other.

13. The composite structural reinforcement device of claim 12, wherein said interlock means comprises a multiplicity of serrations formed in said upper face and in said lower face of said body between said edges thereof in generally perpendicular relation to said longitudinal axis of said body.

14. The composite structural reinforcement device of claim 13, further comprising alignment means for the purpose of aligning successive layers of the device during application of the device to a structural member.

15. The composite structural reinforcement device of claim 14, wherein said alignment means comprises a longitudinal groove extending into said body from one of said faces thereof and extending along said body parallel to said longitudinal axis thereof, and a matching longitudinal projection extending outwardly from the other of said faces thereof and extending along said body parallel to said longitudinal axis thereof directly opposite said groove, so that said projection is received in said groove as the device is applied in overlying layers to a structural member.

16. The composite structural reinforcement device of claim 12, further comprising magnetic detection means formed of magnetically detectable material interconnected to said body.

17. A composite structural reinforcement device to be applied to a structural member in a plurality of overlying layers, comprising a continuous elongate body formed of high tensile strength material impregnated with a curable resin, said body having a longitudinal axis, having an upper face and a lower face, and having first and second edges; and alignment means formed in directly opposed relation on said upper face and said lower face of said body for the purpose of aligning successive layers of the device during application of the device to a structural member.

18. The composite structural reinforcement device of claim 17, wherein said alignment means comprises a longitudinal groove extending into said body from one of said faces thereof and extending along said body parallel to said longitudinal axis thereof, and a matching longitudinal projection extending outwardly from the other of said faces thereof and extending along said body parallel to said longitudinal axis thereof directly opposite said groove, so that said projection is received in said groove as the device is applied in overlying layers to a structural member.

19. The composite structural reinforcement device of claim 18, further comprising interlock means having a multiplicity of serrations formed in said upper face and in said lower face of said body between said edges thereof in generally perpendicular relation to said longitudinal axes of said plies, for the purpose of forming a mechanical interlock between said faces during application of the device to a structural member.

20. The composite structural reinforcement device of claim 17, further comprising magnetic detection means formed of magnetically detectable material interconnected to said body.

21. A magnetically detectable composite structural reinforcement device to be applied to a structural member in a plurality of overlying layers, comprising a continuous elongate body formed of a high tensile strength material impregnated with a curable resin, said body having a longitudinal axis, having an upper face and a lower face, and having first and second edges; and magnetic detection means formed of magnetically detectable material interconnected to said body whereby said body is magnetically detectable, by a pipeline structural integrity monitoring device.

22. The composite structural reinforcement device of claim 21, wherein said magnetic detection means comprises a multiplicity of particles of magnetic material attached to at least one of said faces of said body.

23. The composite structural reinforcement device of claim 21, wherein said magnetic detection means comprises a multiplicity of particles of magnetic material embedded within said body.

24. The composite structural reinforcement device of claim 21, wherein said high tensile strength material is formed of fibers and wherein said magnetic detection means comprises fibers of magnetically detectable material intermixed with said fibers of said high tensile strength material.

25. The composite structural reinforcement device of claim 21, wherein said magnetic detection means comprises a ply of magnetically detectable material bonded to at least one of said faces of said body.

\* \* \* \* \*